DIGITAL TRANSDUCER USING RONCHI RULINGS

Filed April 2, 1962 5 Sheets-Sheet 1

Inventor
Daniel Johnson
by Charles W. Helzer
His Attorney

DIGITAL TRANSDUCER USING RONCHI RULINGS

Filed April 2, 1962 5 Sheets-Sheet 2

Inventor
Daniel Johnson
by Charles W Helzer
His Attorney

DIGITAL TRANSDUCER USING RONCHI RULINGS

Filed April 2, 1962 5 Sheets-Sheet 3

Inventor
Daniel Johnson
By Charles W. Helzer
His Attorney

Oct. 26, 1965 D. JOHNSON 3,214,751

DIGITAL TRANSDUCER USING RONCHI RULINGS

Filed April 2, 1962 5 Sheets-Sheet 4

Inventor
Daniel Johnson
by Charles W. Helzer
His Attorney

Inventor
Daniel Johnson
by Charles W Helzer
His Attorney

3,214,751
DIGITAL TRANSDUCER USING RONCHI RULINGS

Daniel Johnson, Galway, N.Y., assignor to General Electric Company, a corporation of New York Filed Apr. 2, 1962, Ser. No. 184,231
10 Claims. (Cl. 340—347)

The present invention relates to a new and improved digital transducer.

More particularly, the invention relates to a tranducer of the type which develops a digital output signal in response to a phenomena to be measured such as force, pressure, torque, temperature, acceleration, lineal motion, or the like.

Due to the large increase in the use of digital computers in control systems, it has become increasingly necessary to convert large quantities of data in analog form to digital form for use by the computers in the system. Because this conversion equipment necessarily increases the complexity of the system, and also inserts an additional source of potential error into the system, it is much more desirable that sensors which provide a digital output signal in response to a phenomena being measured, be employed in the system. Hence, a control system which employs a digital transducer is greatly simplified over the conventional approaches requiring analog to digtial conversion units, and they are also more reliable in that the possibility of loss of information in the conversion and transmission is reduced. While there are some digital transducers available to the industry, they are not altogether practical for all applications, and for this reason, it is desirable to provide to the industry a new and improved digital transducer suitable for use in many new applications.

It is, therefore, a primary object of the present invention to provide a new and improved digital transducer capable of deriving a digital output signal in response to an analog phenomenon being measured.

In practicing the invention a digital transducer is provided which comprises at least one set of relatively movable juxtaposed rulings for producing a Moire fringe effect or its equivalent. A means is provided for moving at least one of the rulings with respect to the other in response to the phenomena to be measured, and electro-optical means are provided for viewing the discrete individual Moire fringe bands produced by the rulings. This last mentioned means includes a means for deriving an output electric signal indicative of the movement of the Moire fringe bands with respect to a fixed point on the rulings being viewed by the electro-optical means. In a preferred embodiment of the invention, a plurality of pairs of relatively movable juxtaposed Ronchi rulings are provided for producing Moire fringe effects. The pairs of Ronchi rulings are arranged in a manner such that the number of lines on the respective pairs of rulings vary in accordance with a predetermined geometric progression such as 1:2:4:8:16:32, etc. In this arrangement, a means is provided for moving at least one ruling in each pair in response to the phenomena to be measured. The device is completed by electro-optical means which are set up to view the discrete individual Moire fringe bands produced by each pair of rulings, and for deriving an output electric signal indicative of the movement of the Moire fringe bands on each pair of rulings with respect to a fixed point on the rulings.

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
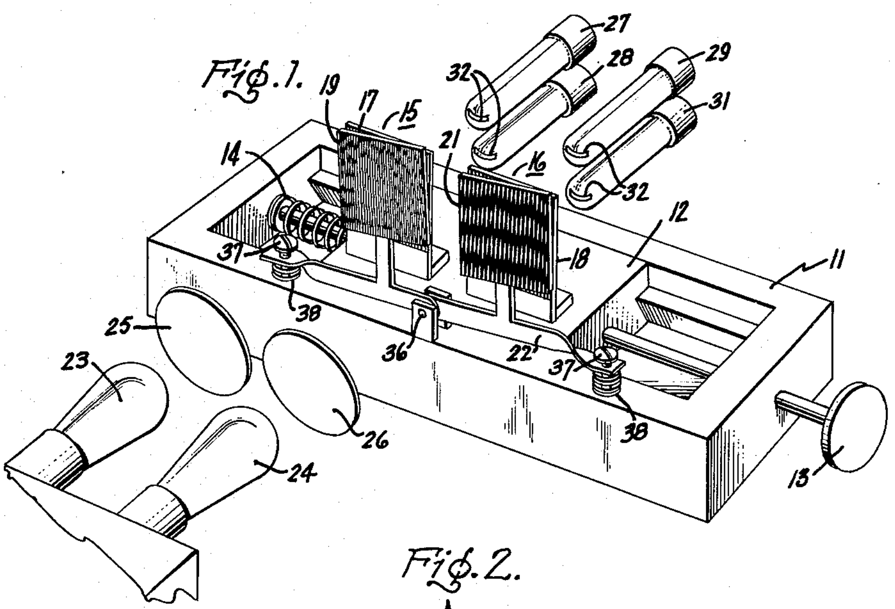
FIGURE 1 is a perspective view of a new improved digital transducer constructed in accordance with the present invention.
Figure 7:
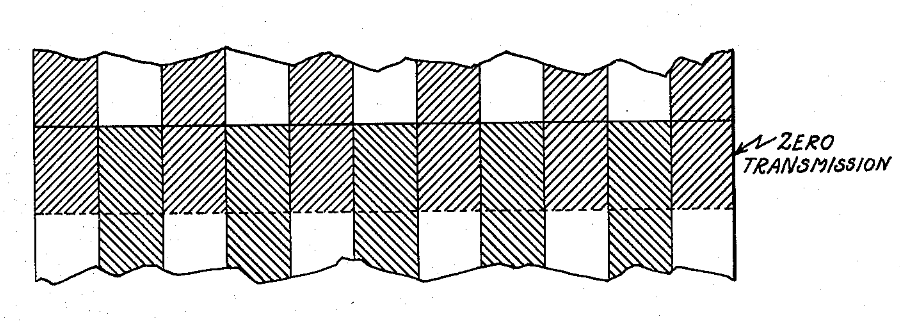
Figure 8:
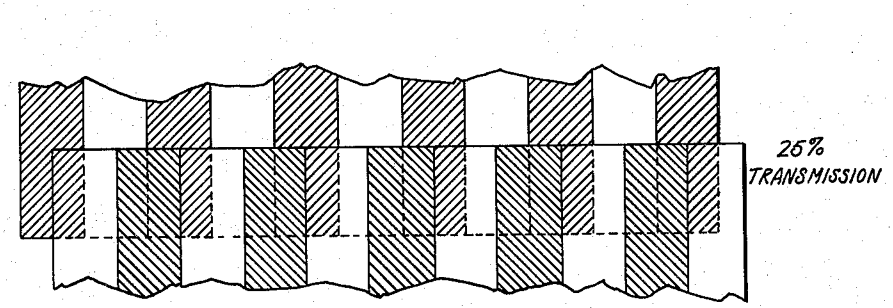
Figure 9:
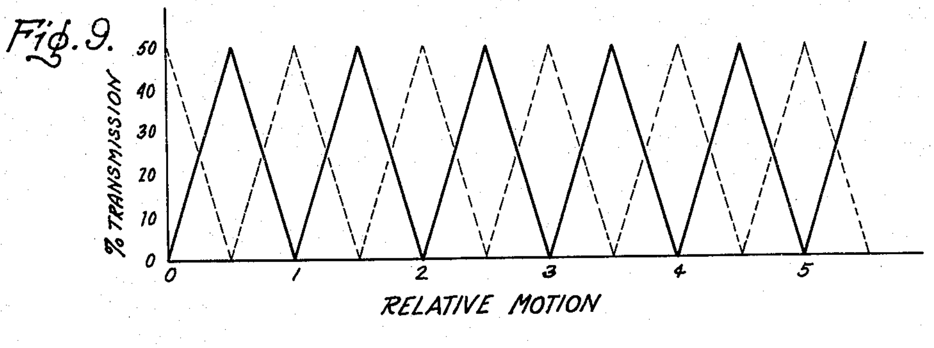
Figure 10:
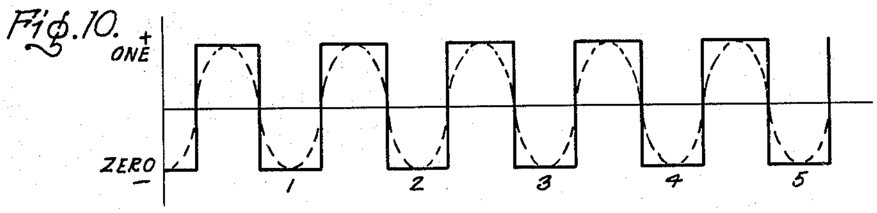
Figure 11:
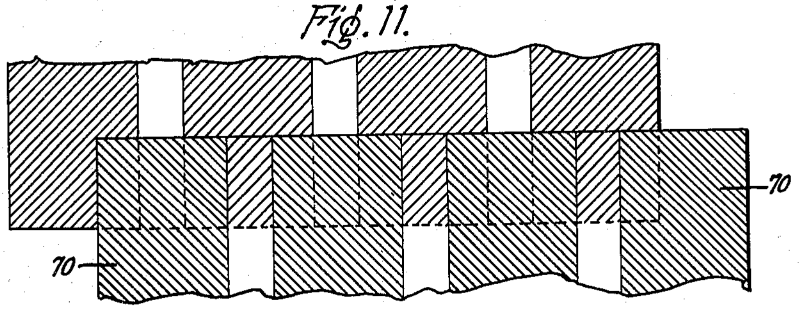
Figure 12:
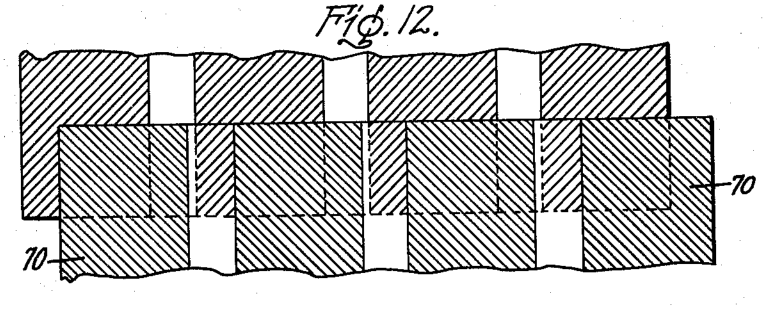
Figure 13:
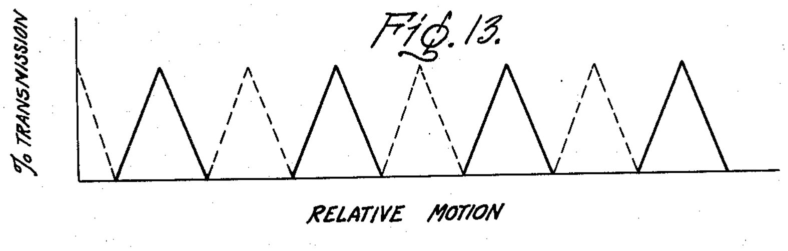
Figure 14:
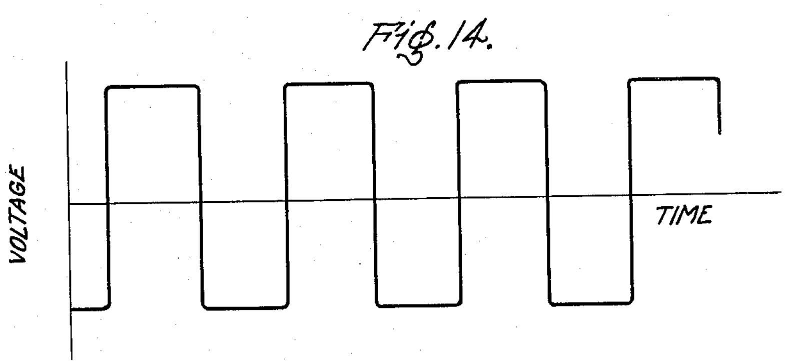
Figure 15:
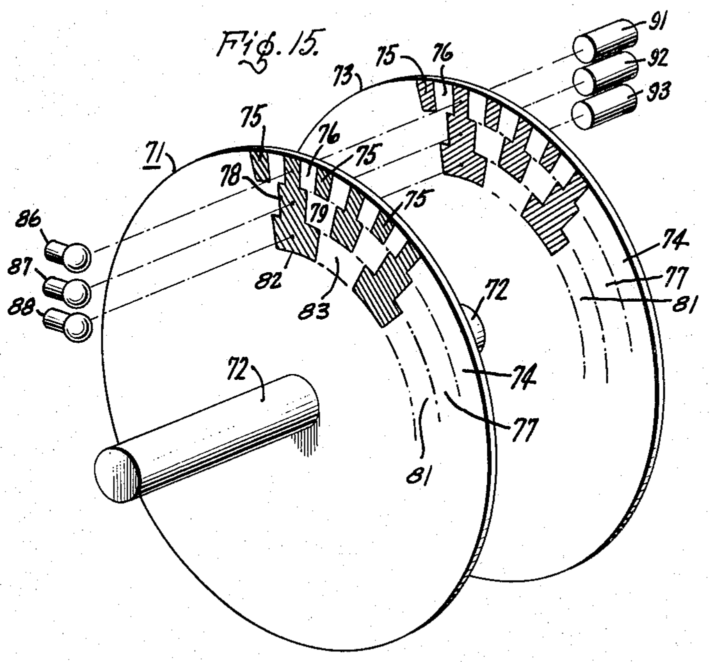

FIGURE 7 of the drawing is a plan view of one arrangement for the Ronchi rulings employed in the digital transducer shown in FIGURE 1 and illustrates the rulings in a zero light transmission condition;

FIGURE 8 is a plan view of the Ronchi rulings shown in FIGURE 7 and illustrates the rulings in a different position for transmitting 25% of the light;

FIGURE 9 is a characteristic curve showing the percent transmission of light versus position characteristics of the Ronchi ruling arrangements illustrated in FIGURES 7 and 8;

FIGURE 10 is a voltage versus position characteristic curve depicting the electric output signal derived from a measuring bridge circuit arrangement excited through the Ronchi ruling arrangements illustrated in FIGURES 7 and 8;

FIGURE 11 is a plan view of a different form of ruling construction employed in connection with the arrangement of FIGURE 7 and illustrates the same in a zero light transmission position;

FIGURE 12 is a plan view of the Ronchi ruling arrangement of FIGURE 11 showing the same in a 5% transmission of light condition;

FIGURE 13 is a characteristic curve plotting the percent transmission of light versus relative motion of the Ronchi rulings of FIGURES 11 and 12;

FIGURE 14 is an electric output voltage versus motion characteristic curve derived with the Ronchi ruling arrangement shown in FIGURES 11 and 12; and FIGURE 15 is a perspective view of a rotary digital transducer constructed in accordance with the invention for deriving a digital output indication of rotary motion.

The new and improved digital transducer shown in FIGURE 1 of the drawings comprises a supporting block 11 having an axially movable carriage 12 slidably supported therein. The axially movable carriage 12 is secured to an axially movable push rod 13 which is adapted to have a moving force applied to its end. This moving force may be in the form of a lineal motion, a pressure, a temperature sensitive member which moves in accordance with the temperature of its environment, an acceleration or other phenomenon to be measured. The lineal motion applied to the push rod 13 acts against a compression spring 14 which normally biases the carriage 12 into a zero output position as explained more fully hereinafter.

From the above description, it can be appreciated that the movement of the carriage 12 within the supporting block 11 comprises an analog measure of the phenomen to be measured applied to the end of the push rod 13. In order to translate this analog movement of the carriage 12 into a digital indication of the phenomenon to be measured, two sets of juxtaposed Ronchi rulings, shown at 15 and 16, are provided. Each of the sets of rulings 15 and 16 preferably are Ronchi rulings of conventional construction which are available commercially through firms such as the Edmund Scientific Company, Barrington, New Jersey. The Ronchi ruling sets 15 and 16 are comprised in part by a movable ruling 17 or 18, respectively, which is secured to the carriage 12 and hence moves with carriage 12. Each set 15 and 16 is completed by a fixed ruling 19 and 21, respectively, which is secured to the supporting block 11 by a respective tiltable supporting arm 22, the function of which will be explained more fully hereinafter. By reason of this arrangement, the two rulings 17 and 18 are movable relative to the fixed rulings 19 and 21 in each set.

In order to derive an output indication of the phenomenon being measured, electro-optical means are provided for viewing each individual pair of rulings 15 and 16, and, in particular, for viewing the Moire fringe effects produced by the juxtaposed Ronchi ruling pairs 15 and 16. This electro-optical means includes a pair of light sources 23 and 24 whose light rays are collimated by a collimating lens arrangement 25 and 26, respectively, and are directed onto the respective Ronchi ruling pairs 15 and 16. Light emanating from the opposite side of the Ronchi ruling pairs 15 and 16 is viewed by two sets of photoelectric devices 27, 28, and 29, 31, respectively. In order to view only discrete areas of the Ronchi ruling pairs with which they are associated, the photoelectric devices 27, 28, and 29, 31 all have masks placed over their ends which have small slits or apertures 32 formed therein for restricting the area being viewed by the photoelectric devices. The photoelectric devices preferably comprise commercially available semiconductor photo cells manufactured by the General Electric Company.

Figure 2:
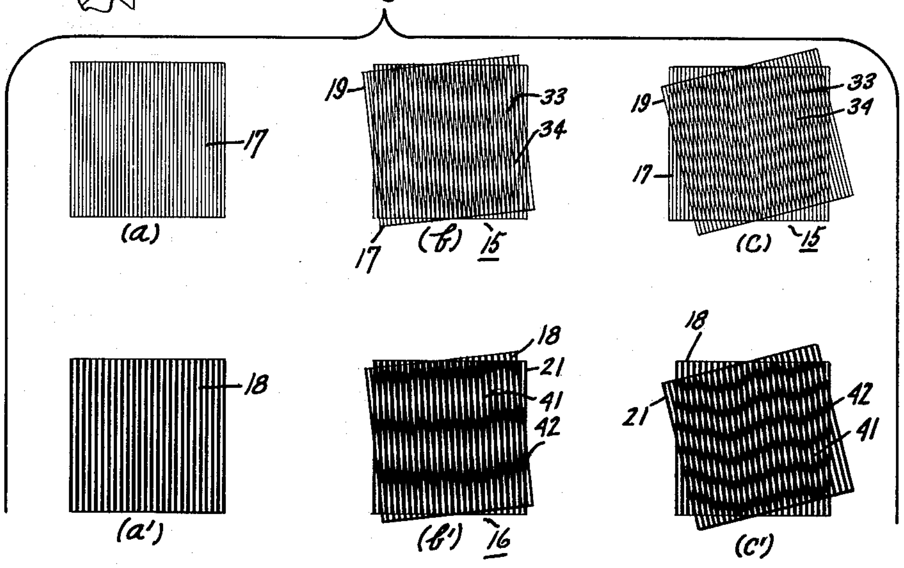
FIGURE 2 is a plan view of two different sets of Ronchi rulings which are used in the digital transducer shown in FIGURE 1 to derive a digital output indication from an applied analog motion to be measured.
Figure 3:
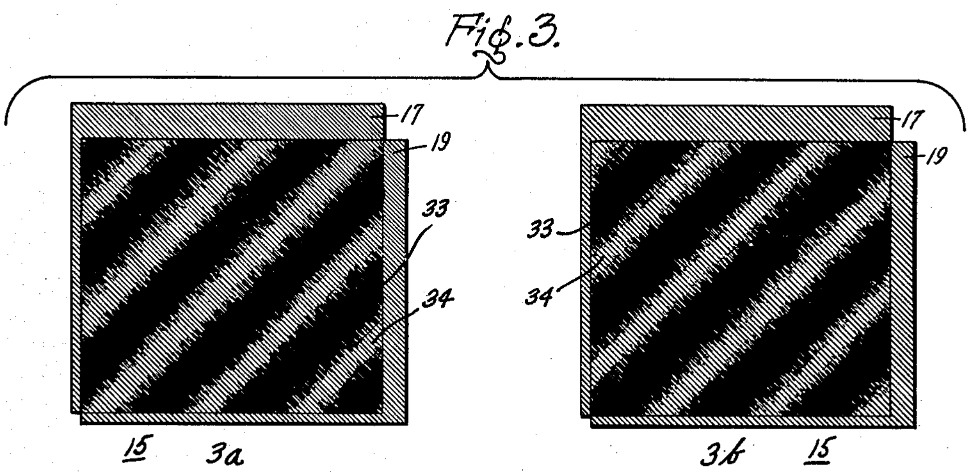
FIGURE 3 is a plan view of a set of Ronchi rulings illustrating the Moire fringe effect, and the manner in which the Moire fringe bands travel across the face of the ruling as a result of relative motion between the two rulings of a pair used in producing the Moire fringe effect.

The effect of the juxtaposed Ronchi ruling pairs 15 and 16 on the light directed against them can be appreciated more fully in connection with FIGURES 2 and 3 of the drawings. For the purpose of the specific disclosure shown in FIGURE 1, the Ronchi rulings 17, 18, 19, and 21 are all comprised by transparent members such as glass which have dark opaque lines formed thereon in the manner shown in FIGURES 2*a* and 2*a′* with the dark opaque lines being of equal width to the intermediate transparent lines. Upon two such Ronchi ruling members being placed in parallel juxtaposed position and being slightly rotated so that the lines of the rulings are at angle with respect to each other as shown in FIGURES 2*b* and 2*c*, they will produce an optical effect known as the Moire fringe effect, wherein alternate dark bands 33 and light bands 34 will be produced across the surface of the rulings. The number of such Moire fringe bands produced across the surface of a ruling of a given dimension will be dependent in part upon the coarseness or width and thence, the number of opaque lines drawn on the ruling. The Moire fringe effects shown in FIGURE 2*b* are produced from two rulings fabricated in the manner shown in FIGURE 2*a* of the drawings and the Moire fringe effects shown in FIGURE 2*b′* are produced by two rulings fabricated in the manner shown in FIGURE 2*a′* of the drawings. From a comparison of FIGURES 2*a* and 2*a′*, it can be appreciated that the ruling shown in FIGURE 2*a′* is much coarser in that the lines are wider and there are fewer such lines for a given area. The effect of such fabrication can be appreciated from a comparison of FIGURES 2*b* and 2*b′* wherein it is seen that the Moire fringe bands produced in the ruling pairs illustrated in FIGURE 2*b′* are much wider and there are fewer such bands across the surface of the ruling than in the pair shown in FIGURE 2*b*. The manner in which this difference is employed in the digital transducer shown in FIGURE 1 will be appreciated more fully hereinafter.

At this point in the description, it is desired to point out another characteristic of the Ronchi ruling pairs which is highly useful in the fabrication of a practical digital transducer constructed in accordance with the invention. This other characteristic can be appreciated from a comparison of FIGURES 2*b* and 2*c* of the drawings. One of the Ronchi rulings in the pair illustrated in FIGURE 2*c* has been rotated relative to the other ruling to a greater degree than is the case with the ruling pairs shown in FIGURE 2*b* of the drawing. As a consequence of this greater rotation so that the lines of one ruling form a more obtuse angle with respect to the lines of the second ruling, a compression or increase in the number of Moire fringe bands 33 and 34 appearing across the surface of the rulings is obtained. This increase in the number of Moire fringe bands, of course, necessarily causes a compression in the size of the bands. This same effect is also illustrated in FIGURE 2*b′* and 2*c′* wherein it can be appreciated that the greater relative rotation of the two Ronchi ruling pairs in FIGURE 2*c′* produces an increase in the number of Moire fringe bands and a consequent decrease in the width of such bands. The practical use to which this characteristic is put in the present invention can be appreciated better in connection with FIGURE 1 of the drawings.

As shown in FIGURE 1, the fixed Ronchi rulings 19 and 21 are mounted on individual rocker arms 22. The rocker arms 22 are pivoted at point 36 and each has an adjusting screw 37 on the end thereof which operates against a compression spring 38 to adjust the angle of tilt of the rocker arms 22. By adjusting the adjusting screws 37, the angular placement of the lines of the fixed Ronchi rulings 19 and 21 with respect to the lines of the movable Ronchi rulings 17 and 18, respectively, can be adjusted so as to adjust the width of the Moire fringe bands produced by the juxtaposed ruling pairs. This adjustment facilitates alignment of the points being viewed by the photoelectric devices 27, 28, 29, and 31.

As mentioned earlier, the photoelectric devices 27 through 31 have masks secured over the ends thereof in which apertures 32 are formed for restricting the view of the photoelectric devices. These apertures are designed so that the photoelectric devices can view only a discrete Moire fringe band appearing on the surface of the Ronchi ruling pairs 15 or 16. It is desired that one of the photoelectric devices 27, for example, view a dark band 33, and that the other photoelectric device 28 paired with it view a light band 34. By this means, it is possible to derive a differential output from the two photoelectric devices 27 and 28 which view the same Ronchi ruling pair, and thereby increase the magnitude of the digital signal being derived from these devices. In order to assure that the photoelectric device 27 indeed views a dark band 33 while the photoelectric device 28 views a light band 34, the adjustment provided by the adjusting screws 37 serves to adjust the relative rotation of the lines of the ruling pairs, and thereby adjusts the width of the Moire fringe band to make such alignment very simple.

With the digital transducer shown in FIGURE 1 arranged in the above described manner and having the photoelectric devices 27 through 31 adjusted to view discrete Moire fringe bands on the respective Ronchi ruling pairs 15 and 16, the device is ready to operate. The operation of the device is best understood in connection with FIGURE 3 of the drawings wherein the Moire fringe bands produced by the ruling pairs are represented by the alternate dark and light bands 33 and 34 shown in FIGURES 3*a* and 3*b*. With zero motion applied to the push rod 13, the Moire fringe bands will assume a zero position as determined by the position of carriage 12 set by compression spring 14. This zero setting might very well have an effect on the Moire fringe bands produced by the individual pairs of rulings as shown in FIGURE 3*a* of the drawings wherein there are six light bands 34 and only five dark bands 33. It is a characteristic of the Moire fringe bands that if one ruling is slid linearly with respect to the second ruling while maintaining the angular relation of the lines of the rulings constant, the Moire fringe bands will tend to move across the surface of the rulings much in the nature of a wave moving across the ocean's surface. The width of the Moire fringe bands will remain constant during this movement, and if the rulings are moved essentially perpendicular to the lines a distance equal to the width of one ruling line, then the Moire fringe bands will move through one complete band width. Hence, the Moire fringe bands 33 and 34 will reflect or indicate relative movement between the lines of the individual rulings in the pair by merely shifting across the surface of the ruling members in the manner illustrated in FIGURES 3*a* and 3*b*. In FIGURE 3*a* it is seen that there are six light bands 34 and five dark bands 33, and in FIGURE 3*b* due to a movement equal to the width of a half a ruling line causing a 180° degree shift in position of the Moire fringe bands, there are six dark bands 33 and five light bands 34. From this description, it can be appreciated that by coupling one of the rulings in each pair to the movable carriage 12 and fixing the remaining ruling in the pair to the supporting block 11, the amount that one ruling is caused to move relative to the remaining ruling in the pair will be in proportion to the lineal motion, force, or other phenomenon desired to be measured that is applied through the push rod 13 to position the carriage 12.

From a further consideration of FIGURES 3*a* and 3*b*, it can be appreciated that after the Ronchi rulings have been moved through one complete Moire fringe band, that is the lines of the rulings have been moved one complete line width, the position of the Moire fringe bands on the surface of the ruling member will be precisely at the point at which it started. If the movable ruling is continued to be moved in the same direciton, the result will be a cyclical shifting in the light level at the point being viewed in the manner best depicted by the characteristic curve shown in FIGURE 6*a* of the drawings. It can be further appreciated that if the lines from which the respective ruling pairs are fabricated have a varying density or coarseness, that is, the opaque lines become increasingly larger as the number of pairs of rulings is increased in the manner illustrated in FIGURE 2*a'*, then the amount of lineal movement required to cause a Moire fringe band to shift through a complete cycle is greater. If the number of lines on the respective pairs of rulings is then varied in accordance with a predetermined geometric progression, such as the progression 1:2:4:8:16, it then becomes possible to derive a digital output indication of the position of the movable ruling of each pair relative to its partner, and from the combination of such readings derive a discrete and unique digital indication of the analog position of the movable carriage 12, and hence, a discrete and unique digital output indication of the phenomenon being measured. The manner in which this is accomplished is best understood in connection with FIGURE 6 of the drawings.

Figure 6:
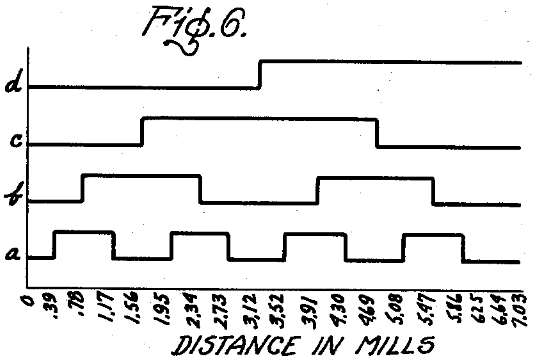
FIGURE 6 is a series of wave shapes illustrating the phase relation of the electrical output signals derived by the various phototubes and their associated circuitry used with the digital transducer shown in FIGURE 1.

FIGURES 6*a* and 6*b* of the drawings represent a series of wave shapes which are representative of the electrical output signals derived from the photoelectric devices 27 through 31 of the digital transducer shown in FIGURE 1. These output signals are obtained from circuit arrangements shown in FIGURES 4 and 5 of the drawings which will be described more fully hereinafter. For present purposes, however, it is sufficient to point out that these circuits serve to derive an output square wave signal from each pair of photocells each time that a Moire fringe band shifts from a dark band area to a light band area in front of that particular pair of photocells. As can be readily determined from a comparison to FIGURES 2*b* and 2*b'*, the duration or length of this square wave signal will be dependent upon the width of the Moire fringe band being viewed and this in turn is dependent on the spacing between the lines of the pair of rulings that produce the Moire fringe effect being viewed. Accordingly, if it is assumed that a Moire fringe band spacing such as illustrated by the Moire fringe bands 33–34 in FIGURE 2*b* of the drawings produces an output signal wave form as shown in FIGURE 6*a* as the Moire fringe bands are caused to travel across the surface of the rulings pair 15, for example, than the Moire fringe bands 41 and 42 of the rulings pair 16 shown in FIGURE 2*b* would produce a wave form such as shown in FIGURE 6*b* of the drawing. From a comparison of these two figures, it can be readily determined that the signal shown in FIGURE 6*b* has a much greater period and hence, lower frequency than the signal wave form shown in FIGURE 6*a*. This is to be expected since the lines of the rulings pair which produced Moire fringe bands 41 and 42 are wider than the lines of the rulings pair that produced the Moire fringe bands 33 and 34. If the digital transducer in FIGURE 1 were designed to measure larger linear motions, then it would be necessary to add additional ruling pairs having fewer lines as determined by the geometric progression 1:2:4:8:16, etc., in the same manner as illustrated for the ruling pairs 15 and 16, together with their associated light sources and photoelectric devices to develop additional output signals such as shown in wave forms 6*c* and 6*d*. Accordingly, to develop the wave form 6*c* with such an arrangement, the first additional ruling pair (not shown) would have to have half the number lines of the ruling pair 16 used to develop the signal shown in FIGURE 2*b* and in order to develop an output signal such as shown in FIGURE 6*d*, the second additional ruling pair (not shown) would require only half as many lines as that required to produce the signal shown in FIGURE 6*c*. With the device constructed in this manner, it would then be necessary to properly phase the signals being produced at the output of the photoelectric devices 27 through 31 and their additional counterparts used to view the additional ruling pairs (not shown) so as to obtain the phase relation between the several output signals illustrated in FIGURE 6. With the output signals so phased, one can trace out a desired distance along the abscissa of the curve shown in FIGURE 6 and determine by reading up through the various output signals that at any particular point there exists a discrete and unique code signal for any given horizontal distance. This signal represents the condition or analog position of the movable carriage 12 and hence, provides discrete and unique digital indication of the phenomenon to be measured. For example, if we start from the zero value, reading down through all of the curves *d* through *a* in FIGURE 6, a value of 0000 is given. Moving out at a horizontal distance of 1.56 mils provides a reading of 0110, at a value of 3.12 mils a reading of 1100 is obtained, and at a value of 6.64 mils a reading of 1000 is obtained. From an analysis of these values and of the series of curves shown in FIGURE 6, it can be appreciated that there are 16 discrete and unique combinations of the output signals representing 16 different lineal distance mils along the abscissa of the curve. These 16 discrete values in fact constitute a reflected binary code often referred to as the gray code which is discussed in detail in U.S. Patent 2,632,058 issued March 17, 1953. This gray code or reflected binary code can be readily translated into the conventional binary code by known logic circuit means, or if desired, the reflected binary or gray code can be processed without translation into the conventional binary code. It should be noted, however, that no analog to digital conversion operation, counting, or other ancillary conversion step is required in connection with the output signals generated by the photoelectric devices 27 through 31, in order to obtain a digital output signal representative of the analog position of carriage 12, and hence, representative of the value of the phenomenon applied to the push rod 13.

This gray code or reflected binary coded digital signal is available simply by properly combining the output signals from the various photoelectric devices and by properly adjusting the points of readouts on the Moire fringe bands so as to obtain the phase relations illustrated in FIGURE 6 of the drawings. Accordingly, it can be appreciated that the invention provides a transducer which is capable of providing a discrete and unique coded digital output signal representative of an applied analog input.

Figure 4:
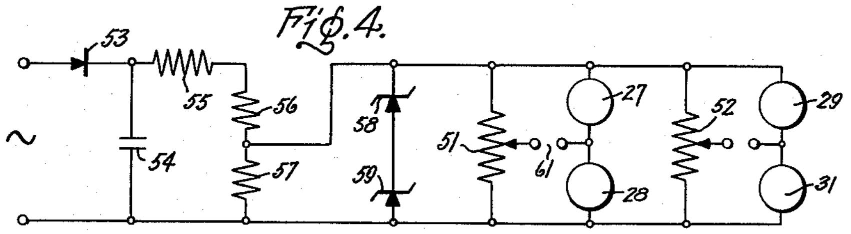
FIGURE 4 is a circuit diagram of a measuring bridge arrangement used with the digital transducer shown in FIGURE 1 of the drawing.
Figure 5:
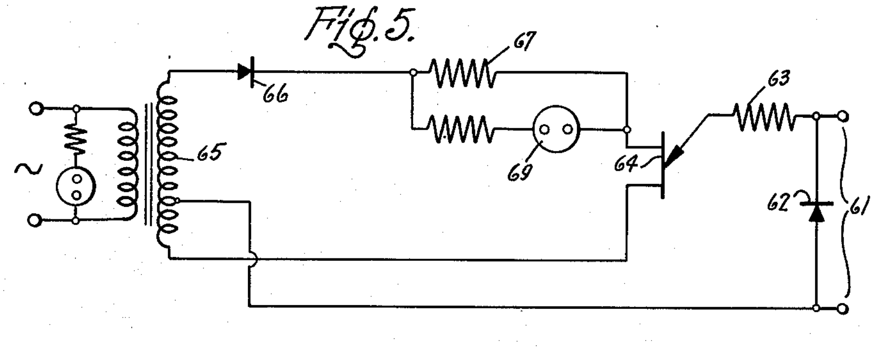
FIGURE 5 is a circuit diagram of a digitizing circuit used to derive a digital output indication from the measuring bridge of FIGURE 4.

The circuits for deriving the digitized electrical output signals represented by the wave forms shown in FIGURE 6 of the drawings, are shown in FIGURES 4 and 5. The measuring bridge arrangement shown in FIGURE 4 of the drawings includes the two semiconductor photocells 27 and 28 arrayed to read out one of the Ronchi ruling pairs 15 and the two photomultipliers 29 and 31 arrayed to read out the other or remaining pair of Ronchi rulings 16. The photocells are connected in a bridge circuit arrangement with a pair of voltage dividing resistors 51 and 52, respectively. It can be appreciated from an examination of FIGURE 4 that the tapped resistor 51 in conjunction with the two photoelectric devices 27 and 28 forms one bridge circuit for reading out the photocells 27 and 28, and the tapped resistor 52 in conjunction with the photocells 29 and 21 form a second bridge circuit. Both bridge circuits are energized from a common direct current power supply comprised by rectifier device 53 and smoothing capacitor 54 connected across an alternating current power supply. The rectified energy stored in capacitor 54 is supplied across voltage dividing resistors 55, 56, and 57 and across a voltage regulating circuit comprised by two series connected Zener diodes 58 and 59 to the input terminals of the two bridge arrangements. The Zener diodes 58 and 59 are diodes of the type which break down and conduct upon having the voltage of a given magnitude applied across their terminals so as to serve as a voltage limiting element and serve to limit the potential appearing across the resistor 57 to a predetermined value. This potential is applied to both of the bridge circuit arrangements to energize the photoelectric devices.

The mid tap point of the photoelectric devices 27 and 28 and the tapped point of the resistor 51 are connected to a pair of output terminals 61 which, in turn, as shown in FIGURE 5 of the drawings, are connected across a diode rectifier 62. The diode rectifier 62, in turn, is connected through a current limiting resistor 63 to the emitter electrode of a unijunction transistor 64. Unijunction transistor 64 comprises a part of the digitizing circuit and is energized from an alternating current supply transformer 65 whose primary winding is connected across an alternating current supply. The secondary winding of the supply transformer 65 is connected through a second diode rectifier 66 and current limiting resistor 67 to one base of the unijunction transistor 64. The remaining base of the unijunction transistor 64 is connected to the remaining terminal of the secondary winding of the supply transformer 65. To complete the circuit, a tap point on the secondary winding of the supply transformer 65 is connected back to the remaining terminal of the diode rectifier 62. By the arrangement during alternate halfcycles of the alternating current supply, the unijunction transistor 64 will be conditioned for conduction. Upon the appearance of voltage applied across the terminals 61, due to an unbalance in the bridge arrangement which includes the photoelectric devices 27 and 28, the emitter electrode will render the unijunction transistor 64 conductive so as to allow a current path to exist through the transistor. Upon this occurrence, a neon tube or other indicating device shown at 69 will be excited thereby providing an indication of the existence of an unbalance in the measuring bridge arrangement of FIGURE 4.

From a consideration of FIGURE 4 of the drawings, it can be appreciated that the potential across terminals 61 tends to follow the potential of whichever photoelectric device is rendered conductive. The photoelectric devices 27 and 28 are rendered conductive by viewing one of the light Moire fringe bands 33 and are essentially non-conductive or highly resistive when viewing a dark Moire fringe band 34. Accordingly, if it is assumed that the photoelectric device 27 is viewing one of the light Moire fringe bands 33, it can be appreciated that the potential at point 61 will be essentially the full positive potential appearing across the resistor 57, and that therefore, this full positive potential will be applied across rectifier 62 to the emitter electrode of unijunction transistor 64 to maintain the unijunction transistor 64 turned on for as long as this condition exists. However, upon the shifting of the Moire fringe bands in accordance with the applied linear motion being measured, as the photoelectric device 27 begins to view a dark Moire fringe band, and the photoelectric device 28 views a light Moire fringe band, the potential at point 61 will assume the negative terminal potential of resistor 57, thereby applying a negative potential to the emitter electrode of unijunction transistor 64 and turning the transistor off. In this manner, the digitizing circuit arrangement shown in FIGURE 5 provides a digital output indication of the Moire fringe band being viewed by the photoelectric devices 27 and 28. If desired, the potential appearing across neon tube 69 may be supplied directly to a digital computer for use by the computer in a control system, or if need be, the potential may be supplied to a conventional shift register for conversion to conventional binary code prior to use by the computer. The photoelectric devices 29 and 31 and whatever additional photoelectric devices are employed in the new and improved digital transducer, would operate in the same manner described above; hence, it is not believed necessary to explain in detail how the additional coded digital output signals such as are exemplified by the wave shapes shown in FIGURES 6*b* through 6*d* are developed.

A second embodiment of a new and improved digital transducer constructed in accordance with the invention is illustrated in FIGURES 7 through 15 of the drawings. In this particular embodiment of the invention, it is anticipated that the rulings used to develop the digital output indication would not have the one-to-one relationship with respect to the size of the dark opaque and light transparent lines of the rulings with the exception perhaps of the first pair of rulings in the set. Such an arrangement is shown schematically in FIGURES 7–14 wherein the construction of the first pair of rulings in the set is shown in FIGURE 7 wherein the position of the first pair of rulings is shown for zero light transmission condition.

FIGURE 8 of the drawings shows what occurs upon the application of a lineal motion to be measured wherein the movable set of rulings is caused to move to a position to allow 25% light transmission to pass through the rulings. FIGURE 9 of the drawings is a characteristic curve plotting the percent light transmission versus position or distance moved by the movable ruling. From an examination of FIGURE 9, it can be appreciated that as the movable ruling is moved due to the lineal motion or other phenomenon to be measured, the light transmission will rise from zero as shown by the solid line to 50% transmission where the dark or opaque lines in each pair of rulings are exactly in overlapping relationship and then will drop back down to zero when the movable ruling has been moved through a distance of exactly one line spacing. The dotted lines indicate the percent transmission received for a phase shift of one-half of a line spacing. With the ruling arrangement such as shown in FIGURES 7 and 8 slightly rotated to produce the desired Moire fringe band effects, the photocells positioned to view the rulings can be connected in a measuring bridge arrangement such as shown in FIGURE 4 of the drawings, and an output electric signal will be derived similar to that shown in FIGURE 10 of the drawings. From examination of FIGURE 10, it can be seen that a cyclical output signal is obtained from the photocells which can be combined with the cyclical output signals received from other pairs of rulings having different line spacings in the manner of FIGURE 6 to derive a discrete and unique coded digital output indication of the lineal motion being measured.

FIGURE 11 of the drawings shows one form of ruling construction for use in fabricating the additional ruling pairs to be employed with the ruling arrangement of FIGURE 7. In the arrangement shown in FIGURE 11, the rulings are fabricated in a manner such that the dark opaque lines are approximately three times the width of the light transmitting lines. As a result of this type of construction, the amount of movement required to cause the rulings to shift from a zero light transmission condition to a condition where some percentage of the light is transmitted through the rulings is considerably greater. This characteristic can be appreciated from an examination of FIGURES 11 and 12 of the drawings wherein it can be seen that if the ruling 70 is caused to be moved, considerably more movement by the lineal motion to be measured is required to shift ruling 70 from the zero light transmission condition shown in FIGURE 11 to the 5% light transmission condition shown in FIGURE 12 than would be required with the ruling arrangement shown in FIGURE 7. The results of fabricating the rulings in this manner are plotted in the characteristic curve shown in FIGURE 13, wherein the percent transmission of light is plotted against the relative motion of the movable ruling 70. The solid line shows the percent transmission of light versus linear motion of ruling for the condition illustrated in FIGURE 11, while the dotted lines illustrate the light transmission characteristics obtained if a shift in phase of approximately 180 degrees is desired. From a consideration of FIGURE 11, it can be seen that rulings fabricated in the manner shown in FIGURE 11 produce a wider dark band and could be combined on a slidable carriage and holder such as shown in FIGURE 1 along with rulings fabricated in the manner shown in FIGURE 7 to provide any desired geometric progression in the relationship of the amount of light transmitted through the ruling of the respective pairs. Hence, the range over which the lineal motion digital transducer can be used can be extended in this manner. It is, of course, intended that the ruling arrangement shown in FIGURES 11 and 12 be used with a photocell readout bridge arrangement such as that shown in FIGURE 4 to derive an output electrical signal such as that shown in FIGURE 14. This output electrical signal could then be combined with the output electrical signals developed by additional sets of rulings such as that depicted by the curve in FIGURE 10 in the manner described with relation to FIGURE 6 of the drawings to provide a discrete coded digital signal having excellent resolution and a unique coded digital value for each intermediate distance through which the lineal motion to be measured moves. With the arrangement shown in FIGURES 7–14, it is anticipated that the photocells will view only a small area of the Moire fringe bands in comparison to the size of the bands themselves. By constructing the transducer in this manner, a sharp cutoff of light to the photocells is obtained, resulting in the production of essentially square wave output signals that might not require further shaping to establish their digital character. This sharp cutoff of light is achieved by careful fabrication of the rulings whose manufacture can be closely controlled less expensively than if the sharp cutoff characteristic were made to depend more heavily on the characteristic of the photocells.

An entirely different version of the new and improved digital transducer constructed in accordance with the invention is shown in FIGURE 15 of the drawings. The digital transducer shown in FIGURE 15 is designed to provide a digital output indication of the magnitude of a rotary motion applied to it. This digital transducer is comprised by a rotatable ruling member 71 secured to a shaft 72 whose rotational motion is to be measured. The rotatable ruling member 71 is placed in a parallel, overlying position with respect to a fixed or stationary ruling member 73, which is substantially identical in construction to the rotating ruling member 71. Each of the ruling members 71 and 73 has a plurality of peripheral rings of rulings formed thereon wherein corresponding peripherial rings on each of the members 71 and 73 are formed of rulings of equal dimensions. For example, the rotating ruling member 71 has an outer peripherial ring 74 of alternate dark opaque and light transparent rulings 75 and 76, respectively, formed around its circumference with the width of the light transparent lines 76 being equal to the width of the dark opaque lines 75. The stationary ruling member 73 likewise has similar outer peripherial ring 74 formed of alternate dark opaque lines 75 and light transparent lines 76 of equal width. Adjacent the outer peripheral ring 74 is a middle peripherial ring 77 having alternate dark opaque lines 78 and light transparent lines 79, with the dark opaque lines 78 and light transmitting lines 79 being of equal width but being of greater width than the width of the ruling lines 75, 76, on the outer peripherial ring 74. The relative width of the lines 78 and 79 of the middle peripherial ring 77 are determined in accordance with the geometric progression 1:2:4:8:16, with respect to the width of the ruling lines 75, 76, in the outer peripherial ring 74. Adjacent the middle peripherial ring 77, is an inner peripherial ring 81 composed of alternate dark opaque ruling lines 82 and light transmitting ruling lines 83 which are equal in width to the dark opaque lines 82. Similarly, lines 82 and 83 of the inner peripherial ring 81 are wider than the width of lines 78, 79 of the middle peripherial ring, which in turn, are wider than the lines 75, 76 in the outer peripherial ring with the width of the ruling lines in the several peripherial rings 81, 77, 74 varying in accordance with the geometric progression 1:2:4:8, etc. The fixed ruling member 73 has similarly formed outer middle and inner peripherial rings 74, 77, and 81 with all the peripherial rings being aligned with corresponding peripherial rings on the rotating ruling mmeber 71 but with each of the peripherial rings of the fixed member having one less ruling line than the rotatable member or vice versa. As an alternative, both ruling members could be idential in construction, but one could be offset slightly with respect to the other in order to produce the Moire fringe effect. Also, in alignment with each of the respective peripherial rings 74, 77, and 81 of both members are light sources 86, 87, and 88, respectively, whose light is collimated by a suitable collimating lens assembly (not shown) and directed through the respective juxtaposed pairs of peripherial rings of rulings. Aligned with the respective pairs of rulings formed by the juxtaposed peripherial rings 74, 77, and 81 are a plurality of photocells 91, 92, and 93 which are arranged to view discrete Moire fringe bands produced by the juxtaposed ruling rings 74, 77, and 81, respectively. As a result, the photocells 91 through 93 view alternate dark or light Moire fringe bands as determined by the rotational movement between peripherial rings of rulings in precisely the same fashion as described with relation to the linearly movable rulings shown in FIGURE 1 of the drawings. The photocells 91 through 93 may be connected in a measuring bridge circuit arrangement such as that shown in FIGURE 4 of the drawings so as to derive several output electrical signals which can be combined in a manner such that they have the phase relations depicted by FIGURE 6 of the drawings. Hence, by properly reading out the electrical output signals of each of the photocells, a discrete and unique coded digital output signal may be obtained which is representative of the rotary position of shaft 72.

From the foregoing description, it can be appreciated that the invention provides a new and improved digital transducer which is capable of deriving a discrete and unique coded digital output signal in response to a phenomena to be measured which output signals may be used directly by a digital computer in a control system without requiring further conversion. In two particular embodiments of the invention described, digital transducers are illustrated which derive coded digital output signals representative of a lineal motion to be measured, and of a rotary motion to be measured. This coded digital output signal is obtained without requiring the use of analog to digital conversion apparatus heretofore used in transducers of the same general type. Hence, the invention makes available a new and improved digital transducer which is greatly simplified over conventional approaches requiring analog to digital conversion, and which are much more reliable in operation in that the possibility of loss of information in conversion and transmission is greatly reduced.

Having described several embodiments of a new and improved digital transducer constructed in accordance with the invention, it is believed obvious that other modifications and variations of the present invention are possible in the light of the above teachings. It is therefore, to be understood that changes may be made in the particular embodiments of the invention described which are within the full intended scope of the invention as defined by the appended claims.

What I claim as new and desire to secure by Letters Patent of the United States is:

1. A digital transducer comprising at least one set of relatively movable juxtaposed rulings for producing a Moire fringe effect, means for moving at least one of said rulings linearly with respect to the other in response to a phenomenon to be measured, electro-optical means positioned to continuously view the discrete individual Moire fringes produced by said rulings for deriving a discrete and unique coded signal indicative of the extent of relative movement between the rulings with respect to a fixed zero reference position of the rulings.

2. A digital transducer comprising a plurality of pairs of relatively movable juxtaposed rulings for producing a Moire fringe effect, each pair of rulings having light opaque and light transmitting lines with the number of lines on the respective pairs of rulings varying in accordance with a predetermined geometric progression, means for moving at least one ruling in each pair of rulings linearly with respect to the other in response to a phenomenon to be measured, and electro-optical means for continuously viewing the discrete individual Moire fringes produced by each pair of rulings and for deriving a discrete and unique coded output electric signal indicative of the extent of relative movement between the rulings with respect to a fixed zero reference position of the rulings.

3. A digital transducer comprising a plurality of pairs of relatively movable juxtaposed Ronchi rulings for producing a Moire fringe effect, each pair of rulings having light opaque and light transmitting lines of equal width with the number of lines on each ruling in a pair being the same, and the number of lines on the respective pairs of rulings varying in accordance with a predetermined geometric progression, means for moving at least one ruling in each pair linearly with respect to the other in response to a phenomenon to be measured, and electro-optical means for continuously viewing the discrete individual Moire fringes produced by each pair of rulings and for deriving a discrete and unique coded output electric signal indicative of the extent of relative movement between the rulings of the Moire fringes with respect to a fixed zero reference position of the rulings.

4. A digital transducer comprising a plurality of pairs of relatively movable juxtaposed Ronchi rulings for producing a Moire fringe effect, each pair of rulings being comprised by light transmitting lines of equal width with the number of lines on each member in a pair being the same, and the number of lines on the respective pairs of rulings varying in accordance with the geometric progression 1:2:4:8:16, etc., means for moving at least one ruling in each pair linearly with respect to the other in response to a phenomenon to be measured, electro-optical means for continuously viewing the discrete individual Moire fringes produced by each pair of rulings and for deriving a discrete and unique coded output electric signal indicative of the extent of relative movement of the rulings with respect to a fixed zero reference position of rulings, and means for rotating the rulings in each pair relative to each other to adjust the width of the Moire fringe bands to thereby facilitate alignment of the electro-optical means.

5. The combination set forth in claim 2 wherein said electro-optical means comprises a light source positioned on one side of each pair of rulings and a pair of electro-optical devices for each pair of rulings positioned to view different discrete individual Moire fringes produced by rulings with one of the electro-optical devices positioned to view a light Moire fringe band and the remaining electro-optical device positioned to view a dark Moire fringe band, and wherein the combination is further characterized by means for rotating the rulings in each pair relative to each other to adjust the widths of the Moire fringe bands to thereby facilitate alignment of the electro-optical devices.

6. The combination set forth in claim 2 further characterized by bridge circuit means including said electro-optical means as a part thereof for deriving a discrete and unique coded output electric signal indicative of the extent of relative movement of the rulings with respect to a fixed zero reference position, and an output digitizing indicating circuit means coupled to said bridge circuit means for deriving a digital output indication of the condition of said digital transducer.

7. The combination set forth in claim 3 wherein said electro-optical means comprises a pair of electro-optical devices for each pair of juxtaposed Ronchi rulings positioned to view different discrete individual Moire fringes produced by the rulings with one of the electro-optical devices positioned to view a light Moire fringe band the remaining electro-optical device positioned to view a dark Moire fringe band, and wherein the combination is further comprised by means for rotating the rulings in each pair relative to each other to adjust the widths of the Moire fringe bands to thereby facilitate adjustment of the phase relation of the several output signals produced by the electro-optical devices, bridge circuit means including said electro-optical devices as a part thereof for deriving output electric signals indicative of the extent of relative movement of the rulings with respect to a fixed zero reference position, and output digitizing indicating circuit means coupled to said bridge circuit means coupled to said bridge circuit means for deriving a digital output indication of the condition of said digital transducer.

8. The combination set forth in claim 2 further characterized by means for adjusting the phase relations of the several output signals produced by said electro-optical means by relative rotation of the rulings in each pair.

9. A rotary digital transducer comprised by at least one pair of code wheels with one of the code wheels being secured to and rotatable with a shaft whose rotation is to be measured and the remaining wheel being fixed in a juxtaposed parallel position with respect to the rotatable code wheel, a plurality of peripherally arranged bands of rulings formed on each of said code wheels for producing a Moire fringe effect with the number of lines in the respective bands of rulings varying in accordance with a predetermined geometric progression and with the number of lines in a given peripheral band on one code wheel being substantially equal to the number of lines in the corresponding peripheral band in the remaining code wheel, and electro-optical means for continuously viewing the discrete individual Moire fringes produced by each pair of rulings and for deriving a discrete and unique coded output electric signal indicative of the extent of movement between the rulings with respect to a fixed zero reference position of the rulings.

10. A rotary digital transducer comprised by a plurality of relatively rotatable juxtaposed parallel code wheels, with the wheels having peripherally arranged coinciding bands of rulings for producing a Moire fringe effect and with the number of lines in the respective bands of rulings varying in accordance with a predetermined geometric progression, and electro-optical means for continuously viewing the discrete individual Moire fringe bands produced by the rulings and for deriving a unique and discrete coded output electric signal indicative of the extent of relative movement between the rulings with respect to a fixed zero reference position of the rulings.

References Cited by the Examiner

UNITED STATES PATENTS

| | | | |
|---|---|---|---|
| 2,938,378 | 5/60 | Canada et al. | 73—136 |
| 2,979,710 | 4/51 | Toth | 340—347 |
| 2,993,200 | 7/61 | Waller et al. | 340—347 |

MALCOLM A. MORRISON, *Primary Examiner.*